US011351612B2

(12) United States Patent
Martin et al.

(10) Patent No.: US 11,351,612 B2
(45) Date of Patent: Jun. 7, 2022

(54) MANUFACTURING SUPPORT AND METHOD FOR ADDITIVE MANUFACTURING PROCESS

(71) Applicant: Caterpillar Inc., Deerfield, IL (US)

(72) Inventors: Kevin L. Martin, Washburn, IL (US); Thierry A. Marchione, Herber City, UT (US)

(73) Assignee: Caterpillar Inc., Peoria, IL (US)

( * ) Notice: Subject to any disclaimer, the term of this patent is extended or adjusted under 35 U.S.C. 154(b) by 106 days.

(21) Appl. No.: 16/419,519

(22) Filed: May 22, 2019

(65) Prior Publication Data

US 2020/0368814 A1 Nov. 26, 2020

(51) Int. Cl.

| | |
|---|---|
| ***B22F 10/20*** | (2021.01) |
| ***B33Y 10/00*** | (2015.01) |
| ***B33Y 50/02*** | (2015.01) |
| ***B33Y 40/00*** | (2020.01) |
| *B33Y 30/00* | (2015.01) |
| *B22F 10/30* | (2021.01) |

(52) U.S. Cl.

CPC .............. *B22F 10/20* (2021.01); *B33Y 10/00* (2014.12); *B33Y 40/00* (2014.12); *B33Y 50/02* (2014.12); *B22F 10/30* (2021.01); *B33Y 30/00* (2014.12)

(58) Field of Classification Search

CPC .......... B22F 10/20; B22F 10/10; B22F 10/00; B33Y 10/00; B33Y 50/02; B33Y 40/00; B33Y 30/00

See application file for complete search history.

(56) References Cited

U.S. PATENT DOCUMENTS

| | | | | |
|---|---|---|---|---|
| 9,183,325 | B2 | 11/2015 | Wighton et al. | |
| 9,688,024 | B2 | 6/2017 | Stava | |
| 2016/0107234 | A1* | 4/2016 | Craeghs | B29C 64/135 419/53 |
| 2017/0232670 | A1* | 8/2017 | Joerger | B29C 64/153 264/497 |
| 2018/0065311 | A1 | 3/2018 | Lefebvre et al. | |
| 2018/0086004 | A1 | 3/2018 | Van Espen | |
| 2018/0154441 | A1* | 6/2018 | Miller | B29C 64/40 |
| 2018/0304541 | A1 | 10/2018 | Barth | |
| 2019/0270254 | A1* | 9/2019 | Mark | B29C 64/295 |

FOREIGN PATENT DOCUMENTS

| | | |
|---|---|---|
| CN | 105643943 A | 6/2016 |

* cited by examiner

*Primary Examiner* — Rebecca Janssen

(74) *Attorney, Agent, or Firm* — Bookoff McAndrews PLLC

(57) ABSTRACT

An additive manufacturing method for a part includes forming a pillar by fusing metallic material to form a hollow body portion including a wall having an inner surface and an outer surface and fusing metallic material to form a cap portion extending from a distal end of the body portion. The method includes forming the pillar by fusing metallic material to form a distal portion supported on the cap portion, supporting at least a portion of the part by the pillar, and removing the pillar from the part.

20 Claims, 4 Drawing Sheets

MANUFACTURING SUPPORT AND METHOD FOR ADDITIVE MANUFACTURING PROCESS

TECHNICAL FIELD

Various embodiments of the present disclosure relate generally to additive manufacturing and, more particularly, to manufacturing supports for additive manufacturing processes.

BACKGROUND

Additive manufacturing can be employed to create a variety of parts, including mock-ups, prototypes, components of an assembly, or fully-functional devices. The term “additive manufacturing” encompasses a variety of manufacturing processes that involve constructing a part in a layer-by-layer manner. One type of additive manufacturing, powder bed fusion, involves fusing grains of material together to form a part. Suitable materials for powder bed fusion processes may include polymeric or metallic powder. Laser sintering or electron beam melting may be employed to fuse particles of the powder together. Unsintered powder can be removed at the end of the process, leaving only the fused polymer or metal. Powder bed fusion processes may include depositing a layer of metal powder with a distributing mechanism such as a wiper or a roller, and fusing a portion of the deposited layer with a laser.

Parts that include horizontally-extending features, or features that form an overhang, frequently require support during the manufacturing process. Without support, these features may become bent or otherwise distorted, or may even separate from the rest of the part or cause the part to collapse. To prevent such failures, manufacturing support structures with a box shape have been used. However, box-shaped manufacturing support structures may involve the use of large additional quantities of sintered material, add significantly to printing time, and form sharp edges that can damage the roller. Thus, alternative manufacturing support structures that reduce the size of the lattice and/or eliminate sharp edges may improve the manufacturing process.

An exemplary hybrid support system is disclosed in U.S. Patent Application Publication No. 2016/0107234 (“the ’234 publication”) to Craeghs et al. The hybrid support system disclosed in the ’234 publication includes a volume support structure, a partially solidified support structure, and a reinforcement support structure. This hybrid support system is formed as a network of solid volume supports that are provided below the partially solidified support. While the support system disclosed in the ’234 publication may be useful for supporting some types of parts, it may not be beneficial for parts in which precision is required. For example, the partially solidified portion may be difficult to separate from the part and may include unsupported regions that introduce deformations during the manufacturing process.

The disclosed method, computer-readable storage medium, and pillar may solve one or more of the problems set forth above and/or other problems in the art. The scope of the current disclosure, however, is defined by the attached claims, and not by the ability to solve any specific problem.

SUMMARY

In one aspect, an additive manufacturing method for a part may include forming a pillar by fusing metallic material to form a hollow body portion including a wall having an inner surface and an outer surface and fusing metallic material to form a cap portion extending from a distal end of the body portion. The method may include forming the pillar by fusing metallic material to form a distal portion supported on the cap portion, supporting at least a portion of the part by the pillar, and removing the pillar from the part.

In another aspect, a computer-readable storage medium may store instructions that, when executed by an additive manufacturing apparatus, cause the additive manufacturing apparatus to perform a method including forming a pillar by fusing metallic material to form a hollow body portion including a wall having an inner surface and an outer surface. The method may also include fusing metallic material to form a cap portion extending from a distal end of the body portion and fusing metallic material to form a distal portion supported on the cap portion. The method may additionally include fusing metallic material to form at least a portion of a part supported on the pillar.

In another aspect, a pillar for supporting a part manufactured in an additive manufacturing process may include a hollow body portion including a wall having an inner surface and an outer surface, the wall including fused metallic material, a cap portion extending from a distal end of the body portion, and a distal portion supported on the cap portion.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms “comprises,” “comprising,” “having,” including,” or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, “about,” “substantially,” “generally,” and “approximately” are used to indicate a possible variation of ±10% in the stated value.

Figure 1:
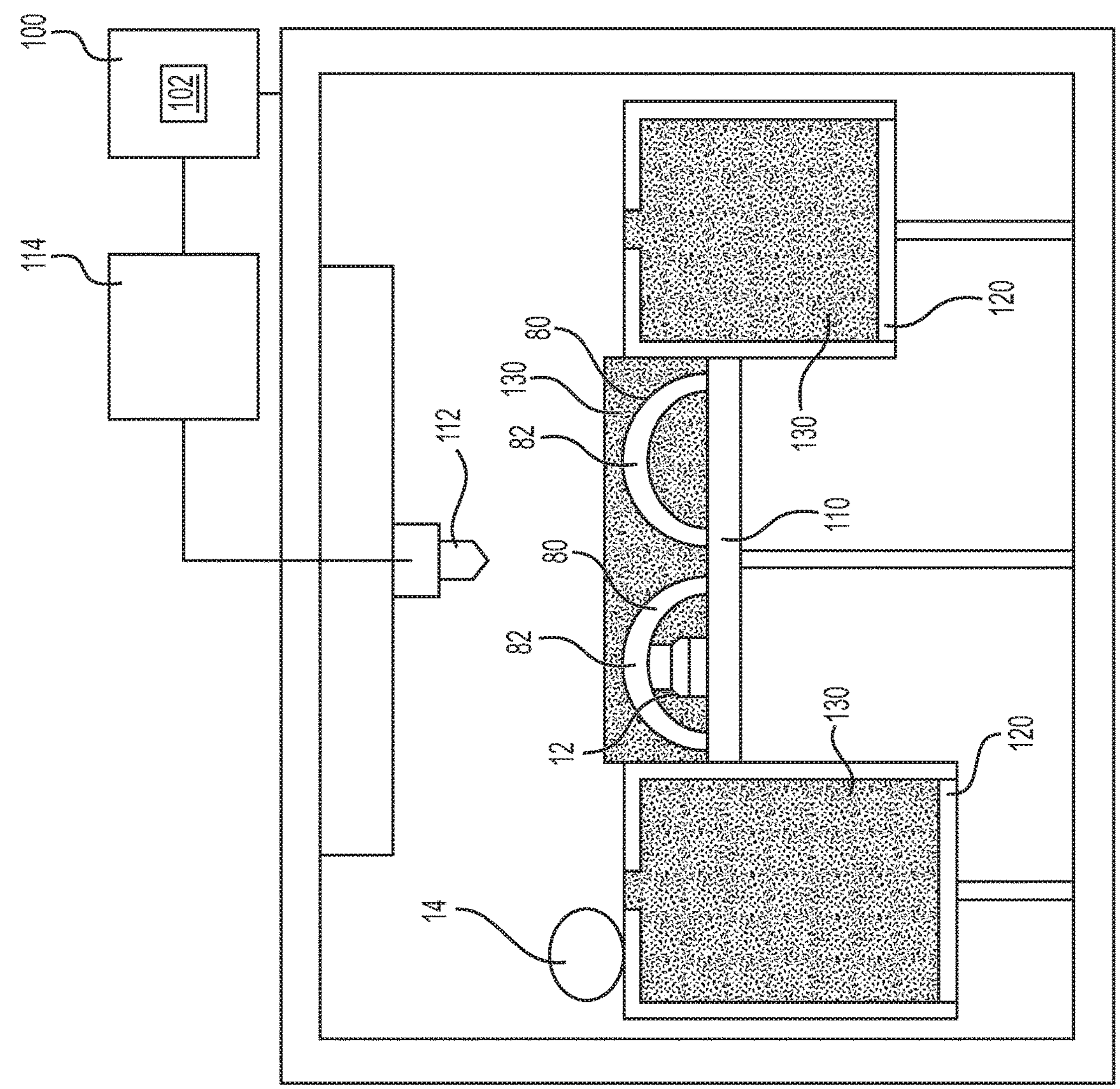
FIG. 1 is a schematic front view of an additive manufacturing system and a support pillar according to an aspect of the present disclosure.

FIG. 1 is a schematic front view of an additive manufacturing system 10 that may form an enclosed space in which a part 80 may be produced. Manufacturing system 10 may be a powder bed fusion device such as a selective laser sintering device. In the exemplary configuration shown in FIG. 1, system 10 may include a platform or part bed 110, a pair (or more) powder beds 120 on opposite sides of part bed 110, and a controller 100. Additive manufacturing system 10 may also include a heating device such as energy source 112, which may be operably connected to a power supply 114. A leveler 14 may be provided within system 10 and movable across powder beds 120 and part bed 110. Controller 100 may be in communication with leveler 14, part bed 110, energy source 112, power supply 114, and powder bed 120.

Powder bed 120 may contain a reservoir of powder material 130. Powder 130 may be any suitable powder material for additive manufacturing via melting or sintering such as polymeric or metallic powder. When metallic powder is fused to produce part 80, energy source 112 may be any suitable energy source configured to provide an energy beam such as a laser. In order to direct a beam of energy, energy source 112 may be included in an assembly including a mirror (not shown).

Leveler 14 may be formed as one or more rollers configured to distribute powder. Leveler 14 be translateable across beds 110, 120 in response to commands output by controller 100. Leveler 14 may include, in addition to or in place of a roller, a wiper leveler (e.g., a rectangular wiper including a blade), or any other suitable leveler that is shaped so as to evenly distribute powder 130.

Part 80 may include one or more overhanging portions 82 that, if left unsupported during the manufacturing process, may potentially cause deformation due to their weight. Overhanging portion 82 may, for example, have a mass that is not sufficiently supported by unsintered (loose) powder 130 that rests under portion 82, as exemplified by part 80 on the right portion of bed 110. Thus, a manufacturing support structure such as pillar 12 may rest on part platform 110 under overhanging portion 82. Pillar 12 may be manufactured by system 10 during the manufacture of part 80.

Controller 100 may be, for example, any suitable computer or other device configured to receive and/or generate a file representing a part and control the various components of system 10 to construct the part 80. In one aspect, controller 100 may be configured to control leveler 14, part bed 110, energy source 112, and powder bed 120 to form a part provided via computer-aided design (CAD) software. In order to control leveler 14, part bed 110, energy source 112, and powder bed 120, controller 100 may be configured to execute instructions provided on a storage medium such as computer-readable storage medium 102. Computer-readable storage medium 102 may include, for example, magnetic storage including floppy disk, hard disk, or magnetic tape; semiconductor storage such as solid state disk (SSD) or flash memory; optical disc storage; magneto-optical disc storage; or any other type of physical memory on which information, a three-dimensional model, or other instructions readable by at least one processor may be stored. This storage medium 102 may store instructions configured to be executed by one or more processors of controller 100 to manufacture, or fabricate, part 80 and pillar 12. These instructions may be generated via CAD software or other appropriate software. Alternatively, the instructions may be transmitted electronically to the controller 100 in a streaming fashion without being permanently stored at the location of the system 10.

Controller 100 may be configured to output control signals to movable platforms within powder beds 120 to direct powder 130 to an upper surface thereof and toward leveler 14. Controller 100 may output control signals to power the energy source 112 via power supply 114 and direct the energy to desired locations of a layer of powder 130 on part bed 110. Controller 100 may also control movement of part bed 110 and leveler 14 via respective motors (not shown). In an alternative configuration, additive manufacturing system 10 may be provided as an arc additive manufacturing system configured to fuse material provided as a wire.

Figure 2:
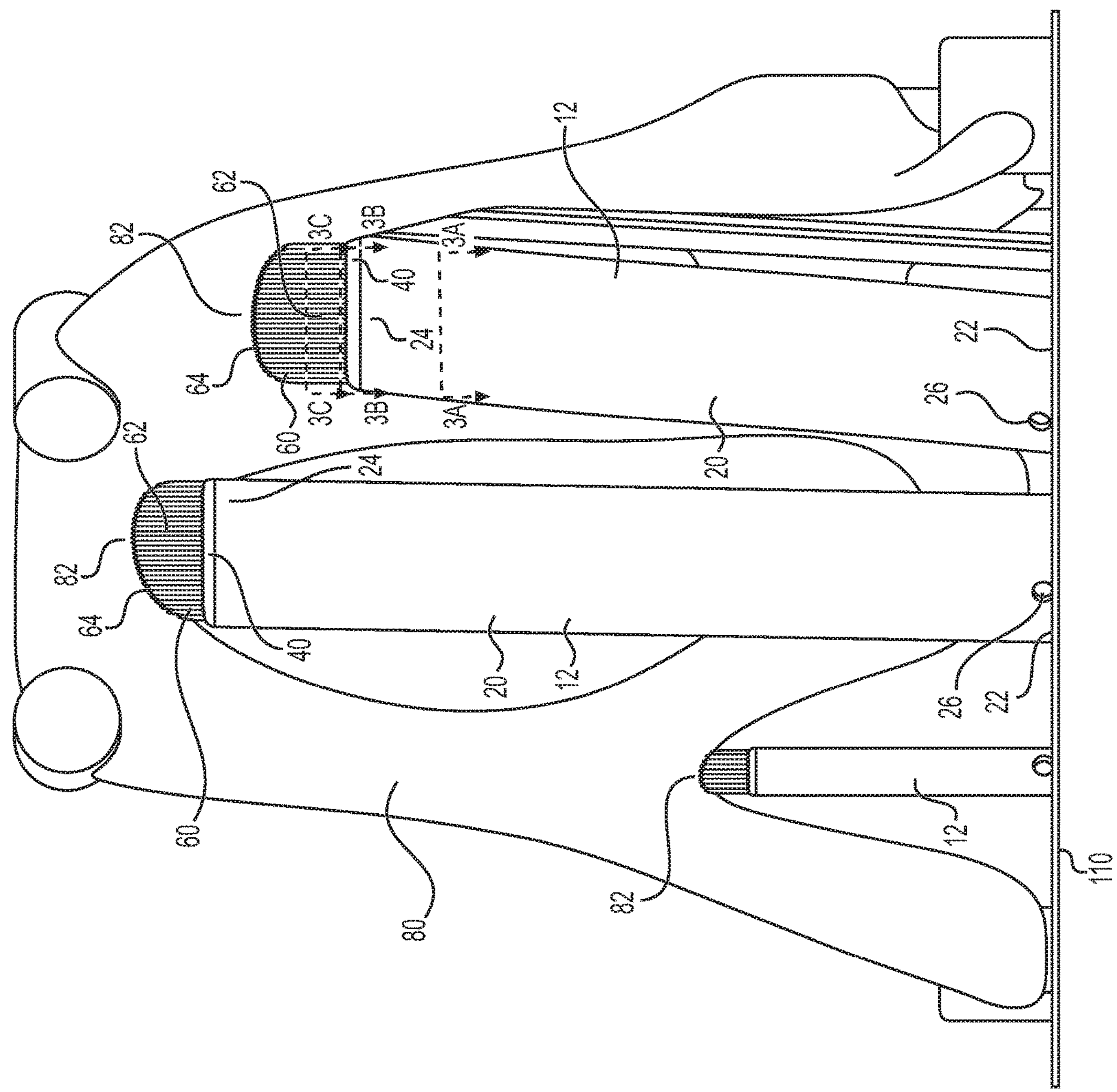
FIG. 2 is a front view showing the pillar of FIG. 1 according to an aspect of the present disclosure.

FIG. 2 is a front view showing an exemplary part 80 and a plurality of pillars 12 supporting respective overhanging portions 82 of part 80. Part 80 may be a part having any desired shape, and may be produced based on a three-dimensional model (e.g., a digital file such as a solid model file or stereolithography (STL) file) provided to controller 100. The model may be converted into a plurality of slices, for example substantially two-dimensional slices, that each define a cross-sectional layer of the part 80. Pillar 12 may similarly be produced based on a three-dimensional model.

Pillar 12 may include a hollow body portion 20, a cap portion 40, and a bridge or distal portion 60 that may provide a bridge between cap portion 40 and overhanging portion 82. Each of these portions of pillar 12 may be formed as a single monolithic structure via the additive manufacturing process. Body portion 20 may extend from a proximal end 22 to a distal end 24. Proximal end 22 may form a bottom of pillar 12 and is closest to and/or resting on part bed 110. A through-hole may extend through an outer surface and inner surface of pillar 12 at proximal end 22 to form a drain hole 26. While one drain hole 26 is shown in each pillar 12 in FIG. 2, two, three, or more drain holes may be provided. Body portion 20 may form a hollow interior of pillar 12 that extends continuously from proximal end 22 to distal end 24. As used herein, "hollow" includes structures that contain unsintered powder or other loose material, air, other gases, etc. Thus, a "hollow" interior may be an interior that does not include fused metal powder. At the conclusion of the manufacturing process, any loose powder may be drained via drain holes 26. Distal end 24 of body portion 20 may support cap portion 40 at a distal end of the hollow interior. Cap portion 40 may cover or extend across a portion or all of distal end 24. In one aspect, cap portion 40 may cover an entirety of distal end 24 and form an upper closed end of the hollow interior.

Cap portion 40 may be formed by one or more inclined walls that gradually converge in a direction distal from body portion 20. For example, cap portion 40 may be formed by a pair of inclined walls (FIG. 3B) that gradually converge or taper in a distal direction. In one aspect, cap portion 40 may extend at an incline from distal portion 24 to a top distal ridge 46 (FIG. 3B). In an exemplary configuration, inclined walls of cap portion 40 may extend at an angle of 35 degrees or more with respect to a horizontal direction. Thus, cap portion 40 may have a greatest width at a proximal portion which is formed integrally with may distal end 24 of body portion 20. Cap portion 40 may have a continuously narrowing width that terminates at a narrowest end formed by distal ridge 46. Thus a width of cap portion 40 may narrow in a direction distal from body portion 20.

The inclined surfaces of cap portion 40 may form a support surface from which distal portion 60 extends. In one aspect, distal portion 60 may include a plurality of individual members 62 that are fused together and form an irregular outer surface. The individual members 62 may include a tapering distal end 64 that is formed integrally with overhanging portion 82. This tapering end 64 may facilitate separation of distal portion 60 from overhanging portion 82 and removal of pillar 12 from part 80. Individual members 62 or groups of members 62 may extend by different amounts in a substantially vertical direction. In one aspect, distal portion 60 may include a series of peaks and valleys at the intersection of overhanging portion 82 and a distal end of distal portion 60. These individual members 62 may be approximately uniformly (regularly) distributed, or may be irregularly distributed. In one aspect, individual members of a lattice, while fused, may have different lengths and/or shapes. Distal portion 60 may be formed as a lattice structure (e.g., a regular or an irregular pattern of nodes and struts or beams such as a honeycomb structure), cone-shaped (e.g., frustoconical) members, cylindrical members, members that together form a block-shape, and/or a plurality of sheet-shaped elements.

Pillar 12 may be provided with a height necessary to support overhanging portion 82. When a plurality of pillars 12 are provided for supporting different portions of a single part 80, the pillars 12 may have different respective heights. In one aspect, an overall height of pillar 12 may be defined by a distance from proximal end 22 of base portion 20 to a distal end of distal portion 60. As shown in FIG. 2, a height of body portion 20 may be greater than a height of cap portion 40 and a height of distal portion 60. In one aspect, a height of body portion 20 may be greater than a combined height of cap portion 40 and distal portion 60. Additionally, a height of body portion 20 may be greater than 50% of the total height of pillar 12. The height of body portion 20 may be greater than 75% of the total height of pillar 12. In an exemplary configuration, the height of body portion 20 may be greater than 85% of the total height of pillar 12. As can be seen in FIG. 2, the size (e.g., width), of pillars 12 may also vary as necessary according to the shape of part 80. In one aspect, a height of each pillar 12 may correspond to a height of the overhanging portion 82, while a width of each pillar 12 may correspond to a width of overhanging portion 82. In an exemplary configuration, a size (width) of pillar 12 may be about 85% or more of the size (width) of overhanging portion 82. Pillar 12 may have a width that is less than a width of portion 82. If desired, a plurality of pillars 12 may together support a single portion 82.

Figure 3C:
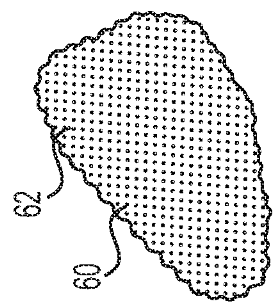
FIGS. 3A, 3B, and 3C are cross-sectional views along lines 3A-3A, 3B-3B, and 3C-3C, respectively, of FIG. 2.
Figure 3B:
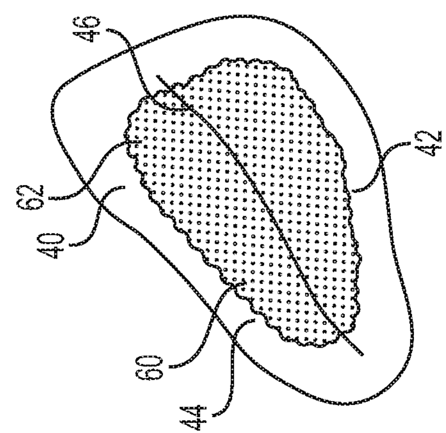
Figure 3A:
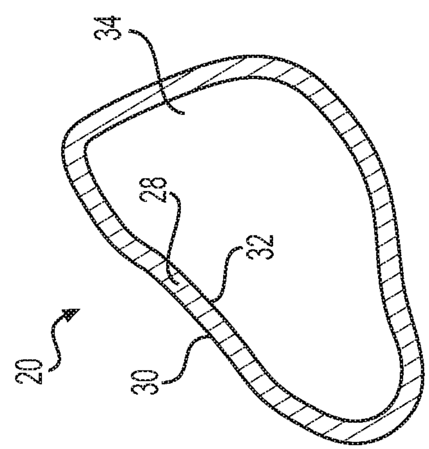

FIG. 3A is a cross-sectional view along line 3A-3A of FIG. 2 illustrating body portion 20. Body portion 20 may be defined by wall 28 which extends so as to define a continuous outer surface 30 and an opposite inner surface 32. A hollow interior 34 of pillar 12 may extend throughout body portion 20, and may be enclosed by wall 28, except where a drain hole 26 is present. Outer surface 30 may form a substantially smooth, at least partially curved surface that is free or substantially free of any sharp edges. The at least partially curved surface of outer surface 30 may have a shape that generally corresponds to a shape of overhanging portion 82. Particularly, outer surface 30 may be formed free of vertically-extending sharp edges. As used herein, a vertically-extending edge is an edge of a portion of a manufacturing support that may face a surface of leveler 14 (FIG. 1). A sharp edge may be formed by the intersection of two surfaces without the presence of a curve. Additionally, the lack of a sharp edge may be measured with respect to a vertical direction. For example, outer surface 30 may be free of horizontally-extending edges such as edges that form a small angle with respect to a vertical direction.

Wall 28 may have an approximately constant thickness. This thickness may, for example, be in the range of about 0.3 mm. to about 2 mm. In one aspect, the thickness of wall 28 may be between about 0.3 mm. to about 1 mm. Such thicknesses of wall 28 may provide adequate support for each portion of pillar 12 as well as for the overhanging portion 82 of part 80, while requiring less material as compared to a support formed entirely of a lattice structure. If desired, wall 28 may be a lower-density wall in which every other layer is sintered, for example. Such a configuration of wall 28 may also have a thickness in a range of about 0.3 mm. to about 2 mm.

FIG. 3B is a cross-sectional view along line 3B-3B of FIG. 2 with part 80 omitted. FIG. 3B illustrates a portion of distal portion 60 and cap portion 40. Cap portion 40 may extend distally from an outer periphery of body portion 20 at a lowest (most-proximal) end of cap portion 40. A width defined by cap portion 40 at a most-proximal portion thereof may be approximately the same as the width of the corresponding portion of body portion 20. Cap portion 40 may include a pair of inclined walls 42, 44 provided on opposite sides of cap portion 40. In one aspect, inclined walls 42, 44 may be provided on opposite sides with respect to a major axis formed by body portion 20. In an exemplary configuration walls 42, 44 may have a thickness that is approximately the same as the thickness of wall 28 of body portion 20. Walls 42, 44 may meet at a highest (most-distal) portion of cap portion 40 to form distal ridge 46. Thus, inclined walls 42, 44 and distal ridge 46 may form a support for distal portion 60. In one aspect, distal portion 60 may have an outer circumferential shape that generally matches a circumferential shape of body portion 20. While the shape of portions 20 and 60 may be similar, a width of distal portion 60 may be smaller than a width of body portion 20.

FIG. 3C is a cross-sectional view along line 3C-3C of FIG. 2 with part 80 omitted. FIG. 3C illustrates a portion of distal portion 60, including a plurality of members 62. Adjacent members 62 of distal portion 60 may be fused together, or may form thin columns that are separated from each other. In an alternate configuration, members 62 may form a honeycomb shape. In one aspect, distal portion 60 may have an approximately uniform width, except at tapering ends 64.

INDUSTRIAL APPLICABILITY

The disclosed aspects of a manufacturing support structure such as pillar 12 may be employed in a variety of additive manufacturing devices and processes. For example, pillar 12 may be employed in any additive manufacturing process in which a part requires support, regardless of the size, shape, or intended use of the part. Pillar 12 may be especially useful for additive manufacturing processes that involve a process of fusing together metal particles and distributing metal particles with a leveler.

Part 80 and pillar 12 may be formed in a layer-by-layer manner by additive manufacturing system 10, for example. In order to form a layer of part 80 and pillar 12, an amount of unsintered powder 130 may be pushed, via powder bed 120, to a position in front of leveler 14. Leveler 14 may then distribute the powder uniformly over part bed 110 to provide an upper layer of unsintered powder 130, as shown in FIG. 1. Energy source 112 may direct a beam of energy towards regions of this layer of powder 130 on bed 110 to melt or sinter precisely-defined regions of the upper layer of powder 130, forming a portion of part 80 and/or pillar 12 by fusing material. To repeat the process, another amount of unsintered powder 130 may be provided by a powder bed 120 and distributed by leveler 14. In an alternative configuration, additive manufacturing system 10 may fuse material such as a wire of material (e.g., in an arc additive manufacturing system).

Figure 4:
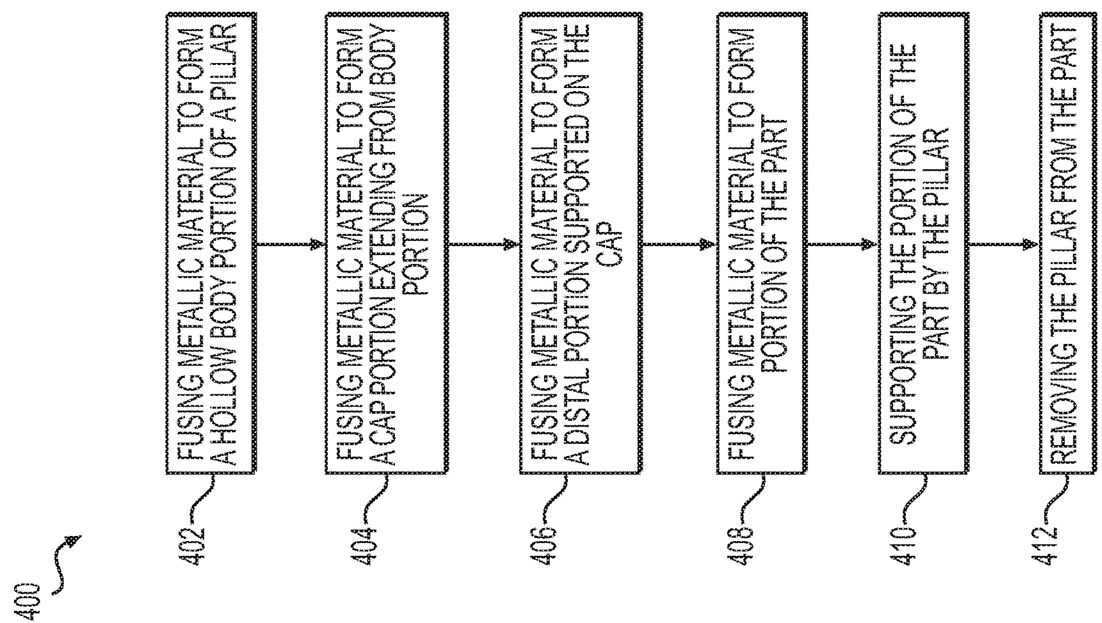
FIG. 4 is a flowchart illustrating a method according to aspects of the present disclosure.

FIG. 4 illustrates an exemplary method 400 for producing a manufacturing support according to aspects of the present disclosure. Method 400 may be performed by executing instructions stored on computer-readable storage medium 102, for example. A digital file representing a part such as part 80 may be provided to controller 100 prior to the performance of method 400. In an exemplary first step 402, metallic material such as powder may be fused such as by laser sintering, for example, to form hollow body portion 20 of pillar 12. This may be performed by repeating a process of distributing and fusing layers of unsintered powder 130. The body portion 20 of pillar 12 formed in step 402 may be supported on part bed 110 or on a portion of part 80.

Step 404 may include fusing metallic material such as powder 130 to form cap portion 40. Step 402 may be performed following the completion of step 402 as cap portion 40 may be integrally formed on a distal end 24 of body portion 20. In one aspect, cap portion 40 may be formed by distributing and fusing unsintered powder 130 at sequential positions above body portion 20. Layers of fused powder 130 may form generally converging walls (e.g., walls 42, 44) during the process of forming cap portion 40. Step 404 may conclude when distal ridge 46 of cap portion 40 is completely formed.

Step 406 may include fusing metallic material such as powder 130 to form distal portion 60 and may at least partially overlap with step 404. In step 406 once at least a portion of cap portion 40 has been formed by fusing powder 130, distal portion 60 may begin to be formed on an upper surface of cap portion 40.

In step 408, a portion of overhanging portion 82 may be formed on a distal region of distal portion 60. Thus, step 408 may include fusing a portion of part 80 to pillar 12. Step 406 may overlap with step 408 based on the geometry of the part 80 being manufactured.

As step 408 may be performed by forming overhanging portion 82 on distal portion 60, the overhanging portion 82 may be supported by pillar 12. In one aspect, in a step 410, a force of the weight of overhanging portion 82, which may increase with each subsequent layer of overhanging portion 82, may be transmitted via distal portion 60 to cap portion 40. The inclined walls 42, 44, may transmit this force to the wall 28 of hollow body portion 20. Thus, pillar 12 may support overhanging portion 82 by transmitting the force of the weight of overhanging portion 82 through each portion of pillar 12. This weight may be uniformly distributed, maximizing the amount of weight pillar 12 can safely support, while eliminating the need to include a reinforcing structure within hollow interior 34.

Step 412 may be performed following the completion of each of steps 402, 404, 406, and 408. Distal portion 60 may be formed with a shape, such as tapering end 64 of members 62, that facilitates removal from overhanging portion 82 of part 80. Thus, in step 412 one or more appropriate tools may be used to separate distal portion 60 from portion 82. For example, a tool such as a cold chisel may readily separate distal portion 60 from portion 82. Any appropriate tool may be used to separate distal portion 60 and portion 82. If desired, a surface of overhanging portion 82 may be polished or otherwise treated following the removal of distal portion 60.

The foregoing exemplary series of steps for performing method 400 may produce one of a plurality of pillars 12. When a part 80 includes multiple overhanging portions 82 that require support, method 400 may be performed at each location that will provide support to overhanging portion 82.

Pillar 12 may provide improved strength with a reduced amount of material. Thus, pillar 12 may provide improved support and avoid deformation. Pillar 12 may therefore be especially beneficial when manufacturing tall parts, or parts with large overhanging portions. The use of a hollow body with a thin wall reduces the amount of material required to produce pillar 12, significantly reducing cost and time necessary to produce a part. In one example, manufacturing time may be reduced by 30% or more. The lack of sharp edges may reduce wear or damage to the leveler 14, whether in the form of a roller or a wiper. Thus, tall parts may be manufactured with reduced chance of creating tears or cuts in the leveler. The form of pillar 12 may also reduce the likelihood that the support structure itself becomes deformed or damaged, which may cause a manufacturing process to fail.

It will be apparent to those skilled in the art that various modifications and variations can be made to the disclosed method and pillar without departing from the scope of the disclosure. Other embodiments of the method and pillar will be apparent to those skilled in the art from consideration of the specification and practice of the systems disclosed herein. It is intended that the specification and examples be considered as exemplary only, with a true scope of the disclosure being indicated by the following claims and their equivalents.

What is claimed is:

1. An additive manufacturing method for a part comprising:

forming a pillar by:

fusing metallic material to form a hollow body portion including a wall having an inner surface and an outer surface;

fusing metallic material to form a cap portion extending from a distal end of the body portion so as to cover an interior of the body portion; and fusing metallic material to form a distal portion supported on the cap portion such that the body portion has a larger width as compared to a width of an entirety of the distal portion, wherein forming the pillar includes successively depositing a layer of loose metallic material on a previously-deposited layer of fused material and fusing the layer of loose metallic material prior to depositing a subsequent layer of loose metallic material;

supporting at least a portion of the part by the pillar; and removing the pillar from the part.

2. The additive manufacturing method of claim 1, wherein the outer surface of the wall is formed free of vertically-extending sharp edges.

3. The additive manufacturing method of claim 1, wherein the body portion is formed with a height that is greater than a height of the cap portion and greater than a height of the distal portion.

4. The additive manufacturing method of claim 1, wherein the cap portion is formed with inclined walls.

5. The additive manufacturing method of claim 4, wherein the distal portion is formed so as to extend from the inclined walls.

6. The additive manufacturing method of claim 5, wherein the distal portion is formed as a lattice having a width that is smaller than the width of the body portion.

7. The additive manufacturing method of claim 1, wherein the outer surface of the body portion is formed so as to be at least partially curved.

8. The additive manufacturing method of claim 1, wherein the cap portion is formed so as to cover a distal end of the body portion.

9. A computer-readable storage medium storing instructions that, when executed by an additive manufacturing apparatus, cause the additive manufacturing apparatus to perform a method comprising:

forming a pillar by:

fusing metallic material to form a hollow body portion including a wall having an inner surface and an outer surface, the body portion having a hollow interior that does not include fused metal powder of a part;

fusing metallic material to form a cap portion having inclined walls extending from a distal end of the body portion that enclose the hollow interior; and fusing metallic material to form a distal portion supported on the cap portion; and fusing metallic material to form at least a portion of a part supported on the pillar.

10. The computer-readable storage medium of claim 9, wherein the method includes forming the outer surface of the wall free of vertically-extending sharp edges.

11. The computer-readable storage medium of claim 9, wherein the method includes forming the cap portion with a distal end that has a width that is narrower than a proximal end of the cap portion.

12. The computer-readable storage medium of claim 9, wherein the method includes forming the body portion with a height that is greater than a height of the cap portion and greater than a height of the distal portion.

13. An additive manufacturing method for a part comprising:

forming a pillar by:

fusing metallic powder to form a hollow body portion including a wall having an inner surface and an outer surface, the body portion having a hollow interior that does not include fused metal powder;

fusing metallic powder to form a cap portion having inclined walls extending from a distal end of the body portion that cover and close an interior of the body portion; and fusing metallic powder to form a distal end portion supported on the cap portion, wherein forming the pillar includes successively depositing a layer of loose metallic material on a previously-deposited layer of fused material with a leveler and fusing the layer of loose metallic material prior to depositing a subsequent layer of loose metallic material;

supporting at least a portion of the part by the pillar; and removing the pillar from the part.

14. The additive manufacturing method of claim 13, wherein the method includes forming the outer surface of the wall free of vertically-extending sharp edges.

15. The additive manufacturing method of claim 13, wherein the method includes forming the cap portion with a distal end that has a width that is narrower than a proximal end of the cap portion.

16. The additive manufacturing method of claim 13, wherein the method includes forming the body portion with a height that is greater than a height of the cap portion and greater than a height of the distal end portion.

17. The additive manufacturing method of claim 13, wherein the inclined walls of the cap portion extend from the distal end of the body portion to a lattice that forms the distal end portion.

18. The additive manufacturing method of claim 13, wherein the wall of the body portion includes a through-hole extending through the inner surface and the outer surface.

19. The additive manufacturing method of claim 13, wherein the distal end portion includes a lattice structure that contacts the part.

20. The additive manufacturing method of claim 13, wherein the cap portion has a greatest width at a proximal end of the cap portion extending from a distal end of the body portion.

* * * * *